(No Model.) 2 Sheets—Sheet 1.

W. MISKOVSKY.
BEET ROOT CULTIVATOR.

No. 508,959. Patented Nov. 21, 1893.

Attest
Walter Donaldson
F. L. Middleton

Inventor
Wenzel Miskovsky
by Ellis Spear
Atty.

(No Model.) 2 Sheets—Sheet 2.

W. MISKOVSKY.
BEET ROOT CULTIVATOR.

No. 508,959. Patented Nov. 21, 1893.

UNITED STATES PATENT OFFICE.

WENZEL MISKOVSKY, OF LIBLIC, AUSTRIA-HUNGARY.

BEET-ROOT CULTIVATOR.

SPECIFICATION forming part of Letters Patent No. 508,959, dated November 21, 1893.

Application filed April 28, 1893. Serial No. 472,185. (No model.)

*To all whom it may concern:*

Be it known that I, WENZEL MISKOVSKY, agriculturist, of 3 Haupstrasse, Liblic, in the Kingdom of Bohemia, Austria-Hungary, have invented a new and useful Beet-Root Cultivator, of which the following is a specification, reference being had therein to the accompanying drawings.

This invention relates to an agricultural machine for digging, loosening and breaking up land and clearing it of weeds, and its object is to produce a machine which will thoroughly accomplish these operations without the additional aid of hand implements.

A machine constructed according to this invention is illustrated in the accompanying drawings reference to which is hereinafter made.

Figure 1:
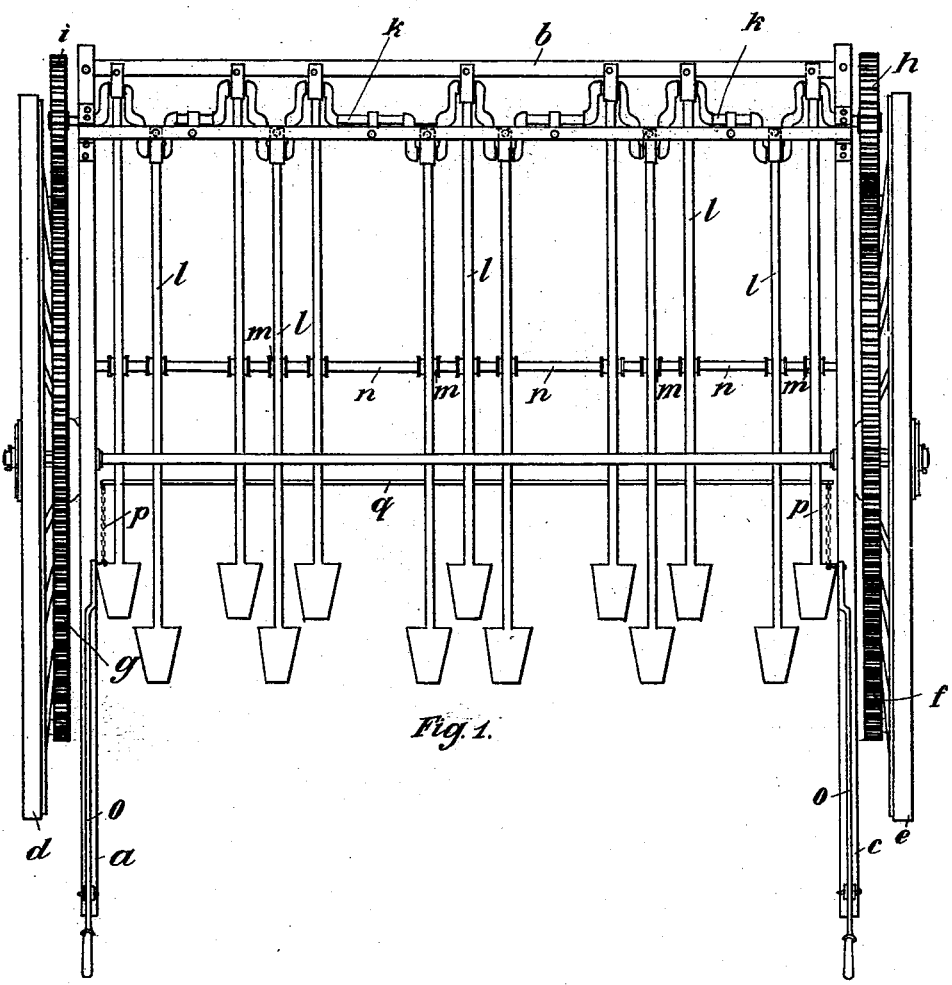
Figure 2:
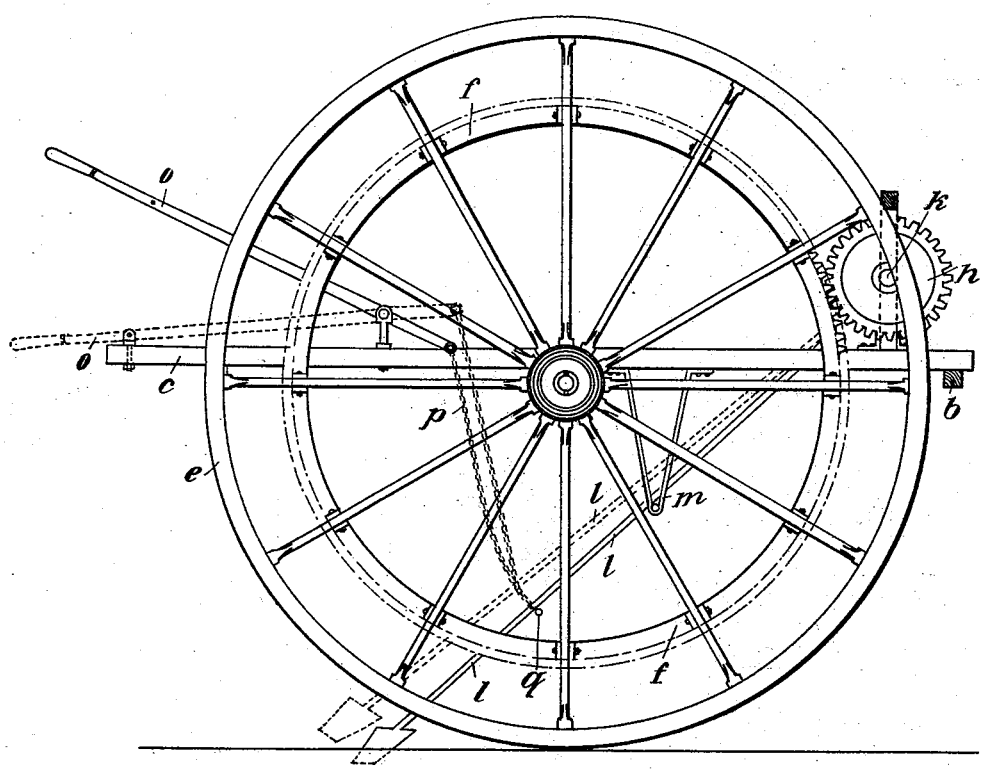

Figure 1 illustrates the improved machine in plan. Fig. 2 shows it in side elevation.

The frame work $a\ b\ c$ of the machine is mounted upon two wheels $d\ e$. Each of these wheels has attached to it a toothed wheel $f\ g$ gearing with the two pinions $h\ i$ secured to the cranked shaft $k$. The shafts or rods $l$ of the spades are suitably secured to the cranks these cranks being preferably so disposed and arranged as to form the spades or digging implements into groups of three. The shafts $l$ are mounted to engage with friction rollers $m$ rotating upon the spindle $n$. The whole of the spade shafts $l$ are above a transverse rod $q$ by means of which they may all be lifted from the ground when it is desired to turn the machine around. Chains $p$ connect the rod $q$ with the levers $o$ by means of which the lifting may be performed as shown in the dotted lines Fig. 2.

In order to facilitate the turning round of the machine one or more of the toothed wheels or pinions and preferably one of the pinions $h\ i$ may be detachably secured to its shaft, for instance, by means of a pin or bolt passing transversely through the boss and shaft or by means of a friction clutch or other well known device. When it is desired to turn the machine round this wheel is loosened and the machine wheels $d\ e$ are free to rotate independently.

What I claim, and desire to secure by Letters Patent of the United States, is—

In a digging machine, the combination with the driving wheels, of the cranked shaft with operating connections to the wheels, a rigid bar supported from the frame, a series of digging tools having their shanks resting on said bar and their rear ends connected with the cranks, a movable bar supported beneath the shanks of the digging tools, and a lever with connections to said movable bar for lifting the same to clear the tools from the ground, substantially as described.

In witness whereof I have hereunto set my hand in presence of two witnesses.

WENZEL MISKOVSKY.

Witnesses:
 J. H. WALDAFFY,
 ADOLPHE FISCHER.